United States Patent
Kauppi et al.

(10) Patent No.: US 7,575,683 B2
(45) Date of Patent: Aug. 18, 2009

(54) PORTABLE WETLANDS

(76) Inventors: Frederick J. Kauppi, 3604 1/2 Park La., Newport Beach, CA (US) 92663; James H. Welsh, 12722 Barrett La., Santa Ana, CA (US) 92705-1300; Stephen R. Lyon, 1803 E. 64th St., Long Beach, CA (US) 90805

( * ) Notice: Subject to any disclaimer, the term of this patent is extended or adjusted under 35 U.S.C. 154(b) by 210 days.

(21) Appl. No.: 11/698,628

(22) Filed: Jan. 26, 2007

(65) Prior Publication Data

US 2008/0179240 A1    Jul. 31, 2008

(51) Int. Cl.
  *C02F 3/32* (2006.01)
  *C02F 3/04* (2006.01)
(52) U.S. Cl. .................. 210/602; 210/617; 210/150
(58) Field of Classification Search .......... 210/602, 210/615–617, 150, 151
See application file for complete search history.

(56) References Cited

U.S. PATENT DOCUMENTS

| 4,169,050 | A | * | 9/1979 | Serfling et al. ........... 210/602 |
| 5,486,291 | A | * | 1/1996 | Todd et al. ............... 210/602 |
| 5,876,484 | A | * | 3/1999 | Raskin et al. ............ 47/62 R |
| 6,126,827 | A | * | 10/2000 | Johnson et al. .......... 210/602 |
| 6,200,469 | B1 | | 3/2001 | Wallace |

FOREIGN PATENT DOCUMENTS

| JP | 2001-198593 | * | 7/2001 |
| JP | 2006-51434 | * | 2/2006 |

\* cited by examiner

*Primary Examiner*—Fred Prince
(74) *Attorney, Agent, or Firm*—Stetina Brunda Garred & Brucker (57) ABSTRACT

The present invention includes a portable Sub-Surface Flow Constructed Wetlands system for removing pollutants from a body of water. The portable wetlands system includes a sealed container having pipes for the inflow and outlet of the water. The system also includes a high surface area substrate located in a lower portion of the container and a heavier substrate and at least one emergent aquatic plant located in an upper portion of the container. The container of the system may be mounted on a trailer and the entire system may be light enough to be capable of being towed by a normal mid-sized pickup truck. The present invention also contemplates a method for removing pollutants from water using such a portable wetlands system. The water to be treated is flowed through the portable wetlands system in order to remove pollutants. The present invention further contemplates a method for constructing such a portable wetlands system.

19 Claims, 6 Drawing Sheets

PORTABLE WETLANDS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to removing pollutants from bodies of water. In particular, the invention relates to portable Sub-Surface Flow Constructed Wetlands systems for use in removing waterborne pollutants.

2. Description of the Related Art

Sub-Surface Flow Constructed Wetlands (SSFCW) have been used in the past to treat a variety of pollutants in water. In principle, these systems consist of a waterproof liner, pea gravel, and various emergent aquatic plants, such as the common cattail, reed, or bulrush. The large surface area of the gravel provides space for the development of a complex microbial community that is capable of transforming and/or removing a broad spectrum of waterborne pollutants, including organic and inorganically-bound nutrients, heavy metals, and organic compounds. These organic compounds include pesticides and gasoline-range and diesel-range organics. In both SSFCW and natural wetlands, there are distinct oxygenated (aerobic) and oxygen-free (anaerobic) zones that are inhabited by a consortia of bacteria that are adapted to thriving in each zone. The common bulrush (genus *Schenoplectus*) has a deep root system that transports oxygen from the upper portion of the plant to the finely dispersed root system. This helps to create several microclimates within a cubic meter that are aerobic and anaerobic. Under aerobic conditions pollutants are oxidized (the removal of electrons) by bacteria (e.g., the conversion of ammonium to nitrate). Under anaerobic conditions, bacteria facilitate the reduction (addition of electrons) of compounds (e.g., the conversion of nitrate to nitrogen gas). In particular, both sulfur and selenium have been shown to be reduced under anaerobic conditions by sulfate-reducing bacterial biofilms. Due to the large surface area of the sticky biofilm coating the pea gravel and root systems there is a two to three log (99%-99.9%) removal of pathogenic bacteria and viruses. The prior art SSFCW publications have dealt with bench and field-scale projects for the treatment of individual and mixed pollutants. A paper entitled—*Treatability Assessment of Industrial Wastes by a Portable Wetland Unit* by Davies et al. published in *Advances in Water Pollution Control: Constructed Wetlands in Water Pollution Control* described the use of a portable gravel-based SSFCW as an assessment tool to test the potential of a full-scale SSFCW. The unit (described by Davies et al.) was strictly a diagnostic tool to test-treat waters from industrial sites, and to analyze the feasibility of permanent—in the ground gravel-based SSFCWs. The size of the unit was approximately 1'×2'×6' and since it was filled with gravel, it provided a limited ability to treat contaminants. The differences and distinctions of this invention are described in subsequent sections of this application.

BRIEF SUMMARY

One embodiment of the present invention contemplates a Sub-Surface Flow Constructed Wetlands (SSFCW) in portable format. In particular, the SSFCW may comprise a trailer having a sealed container. The container may be filled with lightweight substrates that provide a higher surface area than pea gravel. An example of a lightweight, high-surface area substrate is ⅜" perlite. The container may then be planted with emergent aquatic plants. Specifically, the container may be planted with Bulrush (*Schenoplectus* spp.). As the plants mature, they develop a complex root system that extends to the bottom of the container. When filled with water, the lower depths of the container will contain both aerobic and anaerobic microclimate zones. The development of the root system and complex microbial communities in these microclimate zones will allow for the treatment of various pollutants and pathogens. By being disposed on a trailer the SSFCW is extremely portable, thus allowing for the beneficial treatments of bodies of water by beneficial reactions associated with wetlands in areas where it is not desirable or feasible to maintain a permanent wetland site. By utilizing lightweight high-surface area substrates, the portable SSFCW of the present invention is able to remove pollutants from a body of water similar to a large wetlands area while maintaining a small portable footprint and being light enough to be towed by a normal mid-sized pickup truck. Depending on the extent and concentration of the pollutants, the portable wetland may be connected to other portable wetland units to operate in parallel or in series.

Furthermore, this invention contemplates a method of removing pollutants, including organic and inorganically bound nutrients, heavy metals, and organic compounds, from a body of water by utilizing a portable Sub-Surface Flow Constructed Wetlands system as described above. By using lightweight materials in the construction of the portable wetlands, the system can easily be transported from location to location. The portability of the system allows for onsite treatment of contaminated water or soil. The system also allows for onsite generation of "seed" bacteria which can later be incorporated into permanent large-scale SSFCWs. By using high surface area compounds, the treatment capacity of the SSFCW can be increased without a proportional increase in gross weight.

Additionally, this invention contemplates a method of manufacturing a portable SSFCW as described above by attaching a sealed container to a trailer. The container has at least two pipes which are capable of controlling the ingress and egress of water to the unit. The pipes also have a plurality of holes for collecting and transmitting the water. Next, the plurality of holes located on the pipes is covered with a non-reactive first mesh. A non-reactive framework is then constructed within a lower portion of the container and filled with a high-surface area lightweight substrate to a height about equal to the height of the framework. Next, the framework and substrate are covered with a non-reactive second mesh. Finally, a heavier substrate and at least one aquatic plant is planted on top of the second mesh.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
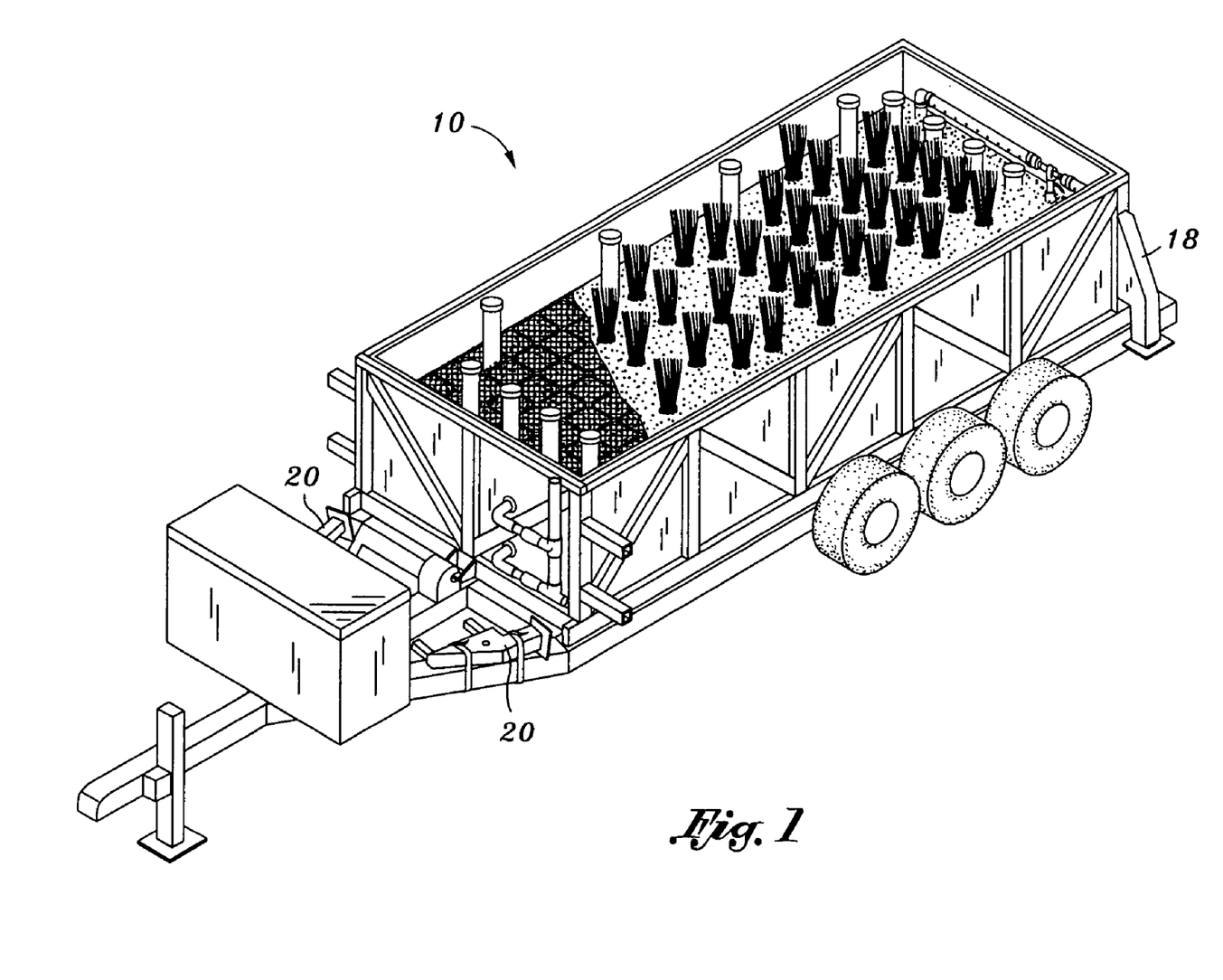
FIG. 1 is a perspective view of a mostly assembled portable Sub-Surface Flow Constructed Wetland as contemplated by one embodiment of the present invention.
Figure 2:
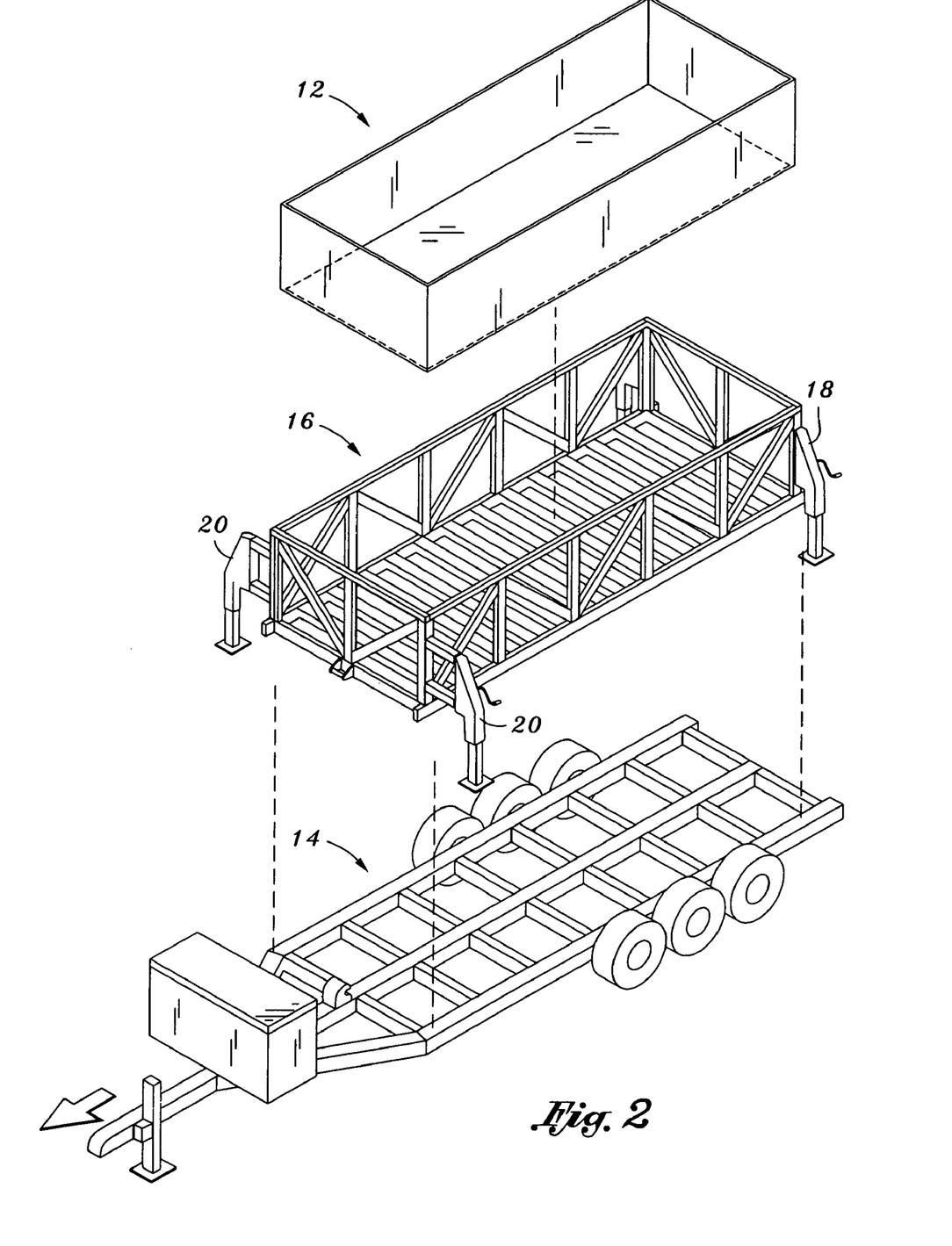
FIG. 2 is an exploded view of the container and trailer assembly of one embodiment of the present invention.
Figure 3:
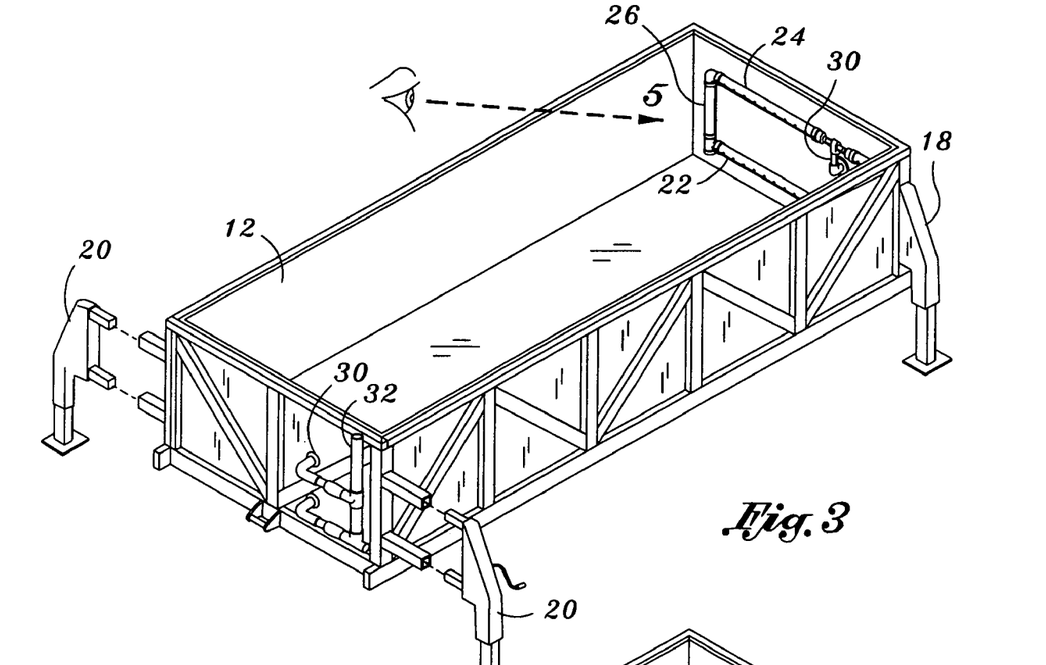
FIG. 3 is a perspective view of a sealed container utilized in one embodiment of the present invention, including pipes for the inflow and outflow of water.
Figure 6:
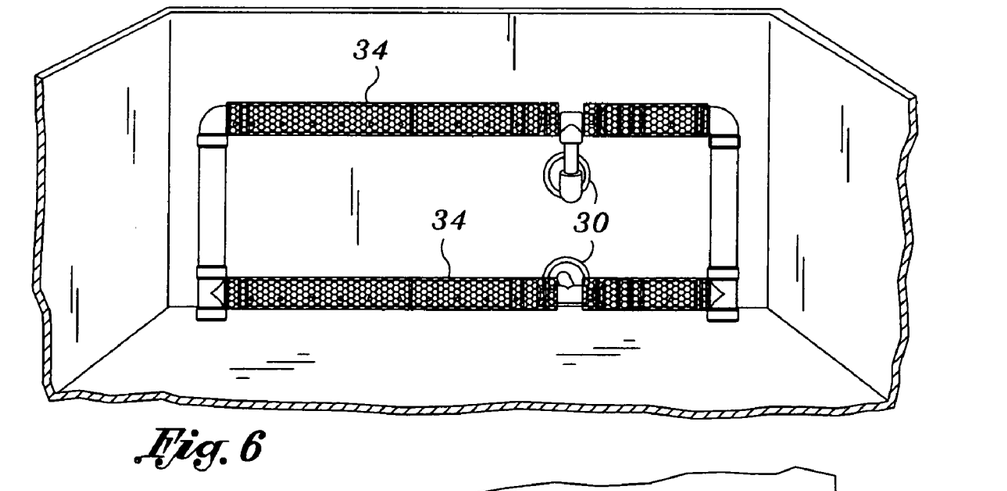
FIG. 6 is a view of the pipes shown in FIG. 5 which have been wrapped in a plastic mesh to prevent the clogging of the inlet/outlet holes.
Figure 7:
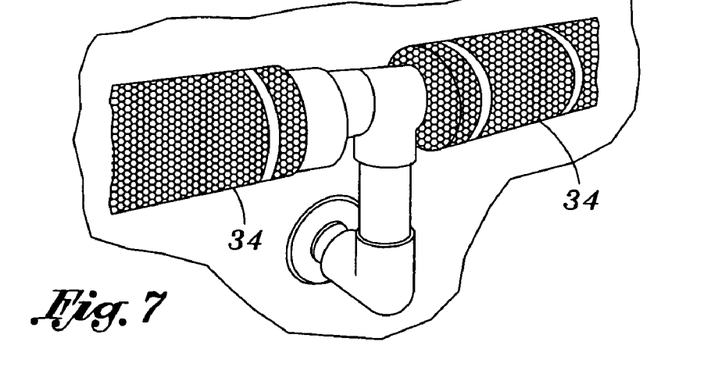
FIG. 7 is a detailed view of the plastic mesh wrapping the pipes shown in FIG. 6.

As shown in FIGS. 1 and 2, one embodiment of the portable Sub-Surface Flow Constructed Wetland (SSFCW) 10 may be constructed by attaching a sealed container 12 to a trailer unit 14. The sidewalls of the container may be supported by an outside framework 16. In a preferred embodiment, the sealed container 12 is six feet wide, four feet high, and twenty feet long. The outside framework 16 may include jack stands 18 located at or near the rear corners of the outside framework 16 as well as jack stands 20 located at or near the front corners of the outside framework 16. Optionally, the jack stands 18, 20 may be attached to the container 12 instead. The front jack stands 20 are mounted so as to extend away from the outside framework 16 and container 12. By having the front jack stands 20 mounted in such a fashion, the trailer unit 14 may be pulled out from underneath the container 12 after the SSFCW unit 10 has been positioned in the desired location and the jacks 18, 20 have been lowered so as to support the container 12. The front jack stands 20 must be mounted away from the container 12 and outside framework 16 so that the wheels of the trailer unit are not impeded when removing the trailer unit 14 from underneath the container 12. As can be seen in FIG. 3, the front jacks 20 may be removable. Additionally, the removed front jacks 20 may optionally be mounted near the front of the trailer unit 14 while in transit. The front jacks 20 may need to be removable in order to meet the maximum width requirements of applicable laws for trailers on public roads, especially if the width of the trailer unit, including tires, is at or near the legal width limit. Since the rear jacks 18 will not impede the trailer unit 14 tires, they may be mounted directly to the outside framework 16 or container 12 if desired. If mounted in this manner, the rear jacks 18 will usually not extend out further than the trailer unit 14 tires, and thus may be fixed and not need to be removable. The container 12 has a plumbing system for controlling the ingress and egress of water to the system. In a preferred embodiment shown in FIGS. 3-7, the plumbing consists of two horizontal pipes 22, 24 running parallel to each other and connected (structurally, but not hydraulically) at the ends by two parallel vertical pipes 26 in order to provide structural support. The two horizontal pipes 22, 24 include a plurality of holes 28 for collecting the treated water and each horizontal pipe 22, 24 has an outlet 30 to control the ingress and egress of water to the system. Each outlet 30 leads to an external pipe 32 which may transmit water into and/or out of the container 12. It is envisioned that two of such plumbing systems will be present in the container 12, on opposing sides of the container 12. For example, the plumbing systems may be present on both the front and the rear of the container 12. By arranging the plumbing in this manner, water may be flowed through the system 10 by entering one end of the container 12 and exiting the other end of the container 12 receiving beneficial treatment in the process. It is contemplated that the water flow may be reversible, i.e., the water may be flowed through the container in either direction as may be necessary. Additionally, the first horizontal pipe 22 is preferably about three inches from the bottom of the container and the second horizontal pipe 24 is preferably about twenty-four inches from the bottom of the container. The pipes are preferably constructed from a plastic, for example, PVC, in order to not react with the biological reactions of the system. Plugs are placed in the joints between the outside ends of the horizontal pipes and the two parallel vertical pipes. As shown in FIG. 6 and in detail in FIG. 7, the horizontal pipes 22, 24 are then wrapped in a first plastic mesh 34 to prevent particles from clogging the collecting holes 28.

Figure 8:
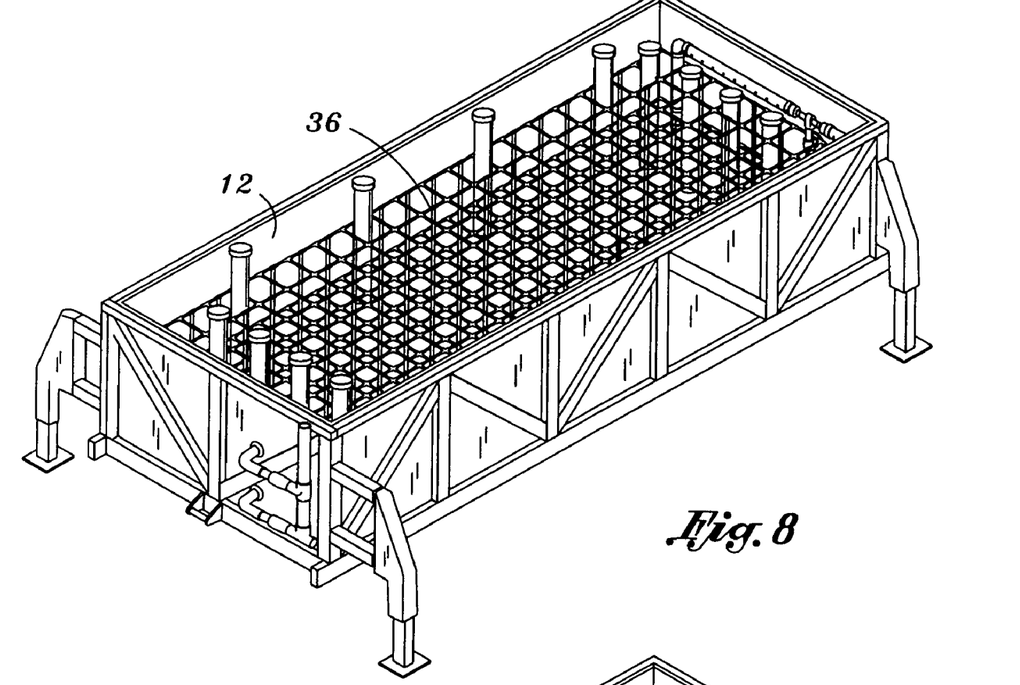
FIG. 8 is a perspective view of the sealed container shown in FIG. 4 and further including a cubical plastic support frame.
Figure 9:
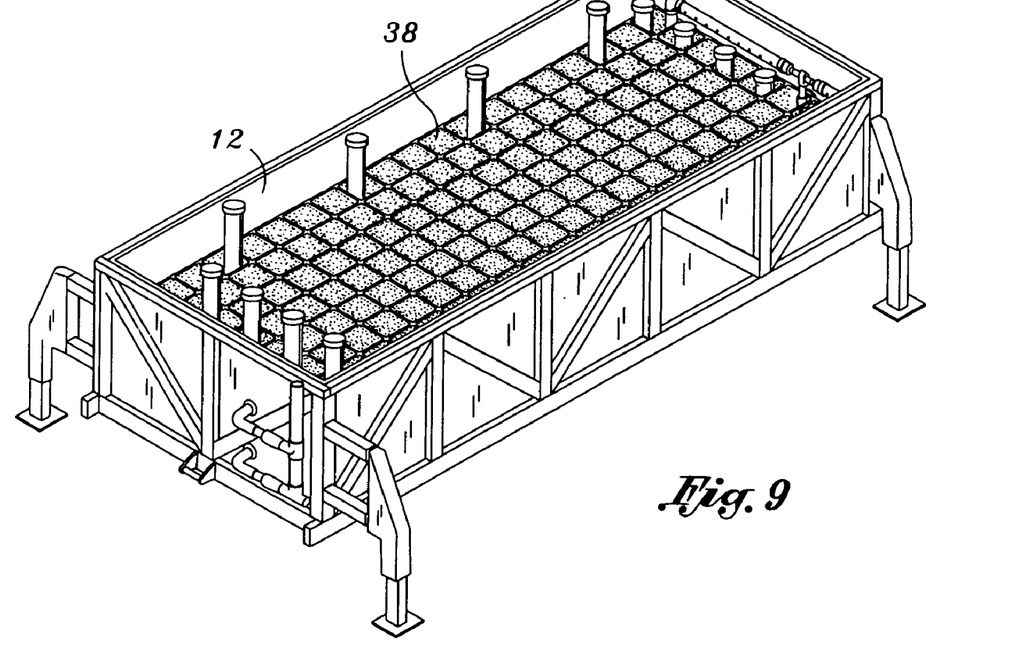
FIG. 9 is a perspective view of the sealed container shown in FIG. 8 and further including a lightweight, high-surface area substrate.
Figure 10:
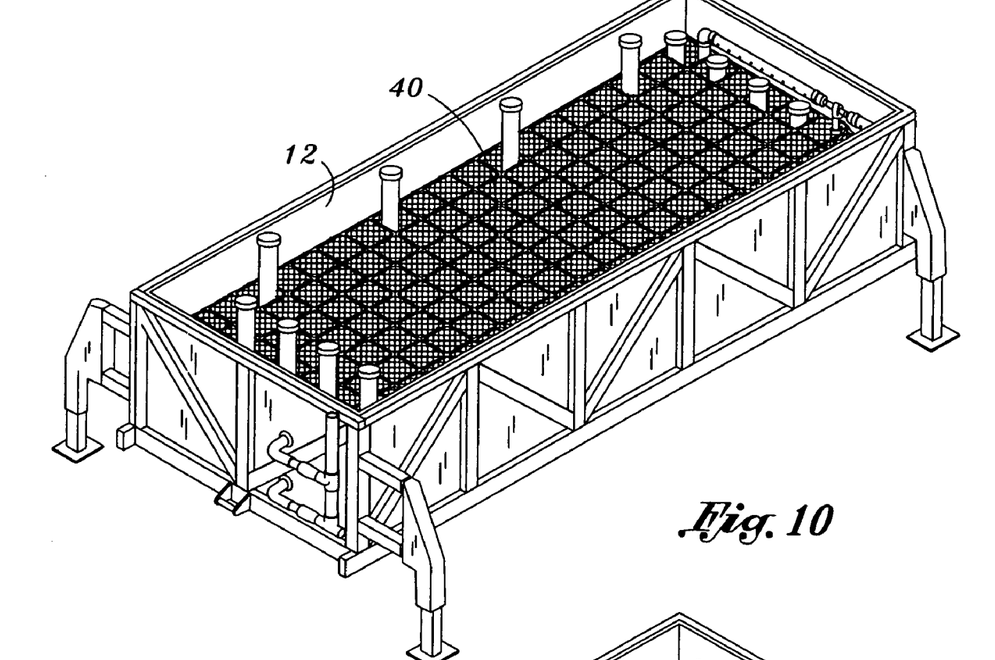
FIG. 10 is a perspective view of the sealed container shown in FIG. 9 and further including a plastic mesh covering the support frame.

Next, as shown in FIG. 8, a plastic frame 36 is then constructed within the entire base of the container 12. Preferably, the frame 36 consists of a series of connected skeletal cubes and has a height of eighteen inches. When constructed in such a manner, the plastic frame fills the width and length of the container while having a height less than the height of the second horizontal pipe. As shown in FIG. 9, a high surface area substrate 38 is then added to the container 12 up to the top of the plastic frame 36. A preferred choice for the substrate 38 is ⅜" perlite which has a higher surface area than either pea gravel or pumice. The plastic frame 36 serves to support the items placed on it without putting downward pressure onto the fragile perlite. As can be seen in FIG. 10, a second plastic mesh 40 is then secured to the top of the plastic frame 36 in order to keep the perlite from floating when water is added to the system as well as to help support the items placed on it.

Figure 11:
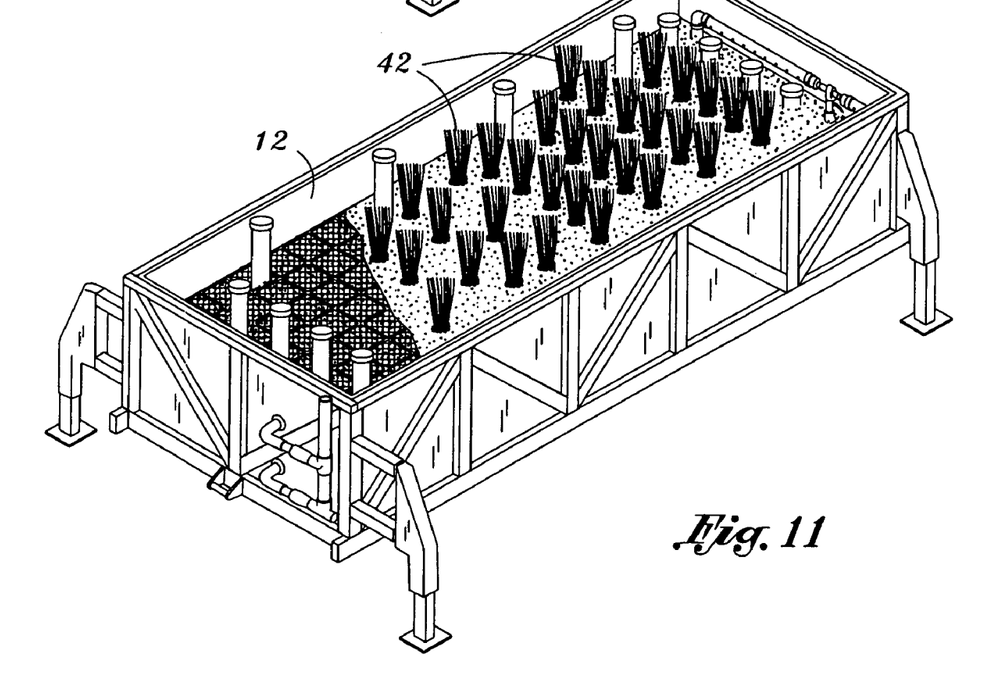
FIG. 11 is a perspective view of the sealed container shown in FIG. 10 and further including a heavier substrate and emergent aquatic plants located on top of the plastic mesh.

Next, a two inch layer of ⅜" pumice is placed on top of the second mesh 40. As can be seen in FIG. 11, emergent aquatic plants 42 are then placed on top of this layer of pumice. Preferably, a plurality of bulrush plants 42 will be placed on top of the second mesh 40 in order to fill the width and length of the container 12. A second layer of pumice is then added to a height just below the top of the container 12 making for an approximate total thickness of fourteen inches of pumice. The second mesh 40 is fine enough to keep the perlite and pumice from mixing together, but porous enough to allow the roots of the bulrush to penetrate to the lower region of the container 12.

Figure 4:
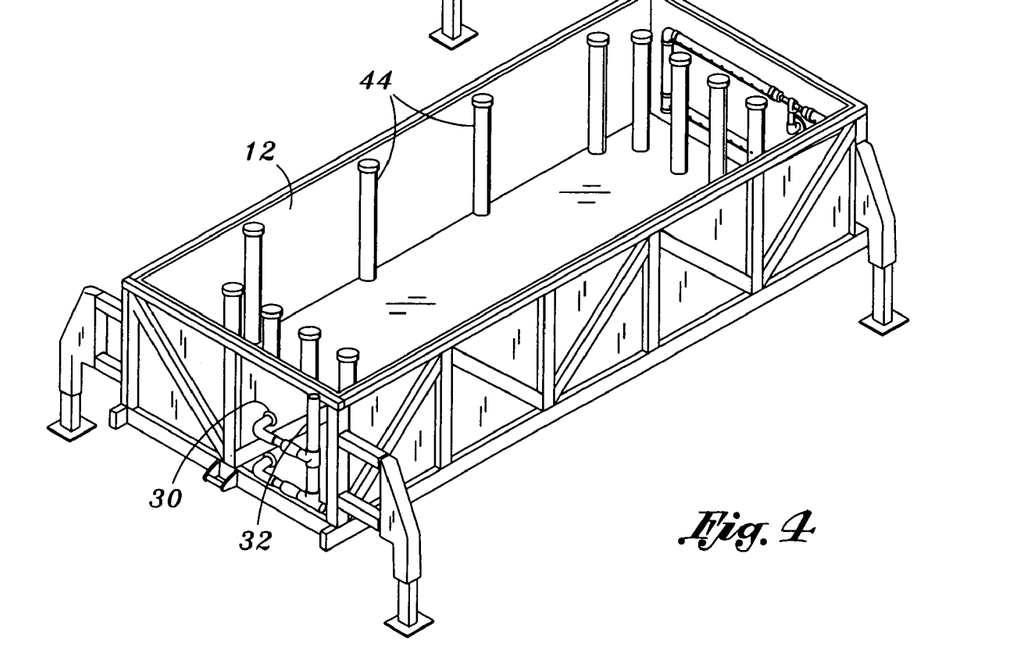
FIG. 4 is a perspective view of the sealed container shown in FIG. 3 and further including ports along the sidewalls for use in sampling the water and/or adding additional components to the water.
Figure 5:
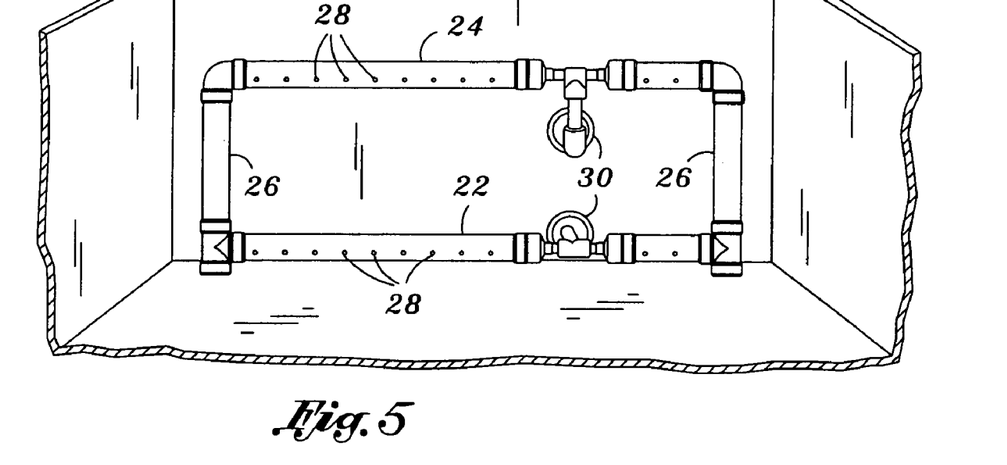
FIG. 5 is a close-up view of the pipes shown in FIG. 3.

As can most readily be seen in FIG. 4, the container 12 may further include ports 44 along the side walls of the container 12 that extend into the lower region of the container 12. Certain ports 44 may be used to add further components to the lower region of the container 12, for example, carbon and/or sulfur. Other ports 44 may be used to monitor or sample the water present in the lower region of the container 12.

The portable wetlands system 10 may then be easily transported to a treatment site by a normal mid-sized pickup truck or similarly sized vehicle. Pollutants in water at the treatment site may be removed by flowing the water through the portable wetlands system 10. The flow rate during such water treatment may be between about ¼ gallon per minute and about fifteen gallons per minute. Preferably the water will flow through the system 10 at a flow rate between ½ gallon per minute and five gallons per minute. The water flowed through such system will be beneficially treated in that pollutants such as organic and inorganically-bound nutrients, heavy metals, and organic compounds, and the like, will be reduced and/or oxidized within the microclimates of the system 10. This results in the removal of harmful compounds from the treated water. Additionally, viruses and harmful bacteria will be removed by the biofilm coating the root systems and perlite present in the lower region of the container 12.

Depending on the severity of the pollutants in the water to be treated, multiple portable wetlands systems 10 may be connected to further remove the pollutants. Such systems 10 may be connected either in parallel or serially. Systems 10 connected in such a manner may therefore be used to treat contaminated water and/or soil onsite. By doing so with a portable system 10, water sites may be treated where it is often impractical or undesirable to create a larger scale permanent SSFCW treatment facility.

The above description is given by way of example, and not limitation. Given the above disclosure, one skilled in the art could devise variations that are within the scope and spirit of the invention disclosed herein. Various other lightweight materials may be used in lieu of or in combination with the perlite/pumice described herein. Examples of other lightweight materials could include various types of foam, plastic bio-balls, HDPE mesh, commercially available products (e.g., Ecomat, porous ceramics) as well as other natural or man-made products. These other lightweight materials are used to support an attached biofilm for an SSFCW. The lightweight materials have a larger surface area compared to an equivalent weight of standard gravel (having a specific gravity of approximately 2.65). The combination of lightweight-high surface area materials enables the present invention to function at high efficiencies (i.e., efficiencies higher than that of traditional gravel based systems). The higher efficiency enables the proposed invention to occupy a smaller surface area footprint for an equivalent treatment rate. In particular, the perlite of the present invention may be combined with a porous ceramic material. Since the ceramic material is not as fragile as the perlite, a system 10 utilizing such a combination may not require the plastic frame 36 utilized when perlite is the sole substrate. Also included are various ways of transporting the portable system 10. For example, the system 10 could be made smaller and capable of being towed by a smaller vehicle. In such an embodiment, multiple units 10 could be connected in order to conduct a large scale decontamination of the body of water. The system 10 could also be made larger, thereby requiring a heavy duty pick up truck or fifth-wheel vehicle to tow the unit 10. The system 10 could also be incorporated into large scale trailers and transported as a conventional truck-tractor rig. For example, the SSFCW unit 10 could be constructed within a conventional end-dump style tractor trailer. In this case, excess weight would not be an issue and heavier, less fragile materials could be used in place of the perlite described above. In addition, if less fragile materials were used the plastic frame 36 would not be required in this embodiment. Another example would be to construct smaller units 10 that are not attached to a trailer. These units 10 could then be loaded and unloaded from flatbed trailers by traditional forklifts or cranes. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable system for removing pollutants from a body of water, the system comprising:
    a. a portable sealed container, said container including pipes for the inflow and outlet of said water, said pipes having a plurality of holes for collecting and transmitting the water, wherein the plurality of holes are covered with a non-reactive first mesh;
    b. a non-reactive framework located in a lower portion of the container, said framework surrounding a first high surface area substrate located in the lower portion of said container, wherein the framework and first substrate are covered with a non-reactive second mesh; and
    c. at least one emergent aquatic plant located in an upper portion of said container, wherein the plant is located on top of the second mesh within a second heavier substrate, also on top of the second mesh.

2. The system of claim 1, wherein the container is mounted to a trailer.

3. The system of claim 1, wherein the first substrate is perlite.

4. The system of claim 3, wherein the first substrate is ⅜ inch perlite.

5. The system of claim 1, wherein the plant is a bulrush from the *Schenoplectus* genus.

6. The system of claim 1 further comprising at least one port extending from the lower portion of said container to the upper portion of said container.

7. The system of claim 6, wherein the port is operative to allow the addition of components to the lower portion of the container.

8. The system of claim 6, wherein the port is operative to allow the removal of at least a portion of water from the lower portion of the container.

9. The system of claim 1, wherein the second substrate is pumice.

10. The system of claim 9, wherein the second substrate is ⅜ inch pumice.

11. A method of removing pollutants from a body of water, the method comprising the steps:
    a. providing a portable system for removing pollutants at the site of the body of water, said system comprising:
        i. a portable sealed container, said container including pipes for the inflow and outlet of said water, said pipes having a plurality of holes for collecting and transmitting the water, wherein the plurality of holes are covered with a non-reactive first mesh;
        ii. a non-reactive framework located in a lower portion of the container, said framework surrounding a first high surface area substrate, wherein the framework and first substrate are covered with a non-reactive second mesh; and
        iii. at least one emergent aquatic plant, wherein the plant is located on top of the second mesh within a second heavier substrate, also on top of the second mesh;
    b. flowing water from the body of water into the system; and
    c. allowing the water within the system to return to the body of water or leave the site of contamination.

12. The method of claim 11, wherein the water flows through the system at a rate between about ¼ gallon per minute and about 15 gallons per minute.

13. The method of claim 12, wherein the water flows through the system at a rate between ½ gallon per minute and 5 gallons per minute.

14. A method of fabricating a portable system for removing pollutants from a body of water, said method comprising the following steps:

a. attaching a sealed container to a trailer, said container having at least two pipes for controlling the ingress and egress of water, said pipes having a plurality of holes for collecting and transmitting the water;

b. covering the plurality of holes with a non-reactive first mesh;

c. constructing a non-reactive framework within a lower portion of the container;

d. filling the container with a high-surface area substrate to a height about equal to the height of the framework;

e. covering the framework and substrate with a non-reactive second mesh;

f. planting at least one aquatic plant on top of the second mesh within a heavier substrate, also on top of the second mesh.

15. The method of claim 14, wherein the high surface area substrate of step d) is perlite.

16. The method of claim 15, wherein the high surface area substrate of step d) is ⅜ inch perlite.

17. The method of claim 14, wherein the plant of step f) is a bulrush from the *Sehenoplectus* genus.

18. The method of claim 14, wherein the heavier substrate of step f) is pumice.

19. The method of claim 18, wherein the heavier substrate of step f) is ⅜ inch pumice.

\* \* \* \* \*